United States Patent [19]

Takenaka

[11] Patent Number: 5,637,542

[45] Date of Patent: Jun. 10, 1997

[54] DIELECTRIC CERAMIC COMPOSITION

[75] Inventor: Tadashi Takenaka, Kashiwa, Japan

[73] Assignee: Nikon Corporation, Tokyo, Japan

[21] Appl. No.: 723,348

[22] Filed: Sep. 30, 1996

[30] Foreign Application Priority Data

Oct. 4, 1995 [JP] Japan .................................. 7-258036

[51] Int. Cl.$^6$ .................................................. C04B 35/46
[52] U.S. Cl. .......................................................... 501/134
[58] Field of Search .................................................. 501/134

[56] References Cited

U.S. PATENT DOCUMENTS

| | | | |
|---|---|---|---|
| 4,978,646 | 12/1990 | Bardhan et al. | 501/134 |
| 5,192,723 | 3/1993 | Fujiu et al. | 501/136 |
| 5,273,944 | 12/1993 | Kagata et al. | 501/134 |
| 5,369,068 | 11/1994 | Kaneko | 501/134 |

*Primary Examiner*—Deborah Jones
*Attorney, Agent, or Firm*—Shapiro and Shapiro

[57] ABSTRACT

A non-lead dielectric ceramic composition comprises a binary system solid solution represented as $(1-x)$ BNT–xNN, wherein BNT is $(Bi_{1/2}Na_{1/2})TiO_3$ and NN is $NaNbO_3$, as constituents of the binary system solid solution, respectively, and $0<x<1$. BNT is a ferroelectric material with a Curie temperature of 320° C. and has a perovskite type crystal structure of a trigonal system. Meanwhile, NN is an anti-ferroelectric material having a perovskite type crystal structure of an orthorhombic system.

1 Claim, No Drawings

DIELECTRIC CERAMIC COMPOSITION

BACKGROUND OF THE INVENTION

1. Field of the Invention

The present invention relates to a composition of a piezoelectric (dielectric) material which is widely applied to fields such as actuators, sensors, and microwave resonators.

2. Related Background Art

A piezoelectric material is a dielectric material, in other words, a piezoelectric material is distorted due to an electric field applied externally (conversion of electric energy to mechanical energy) and it generates a charge on the surface thereof due to an external stress (conversion of mechanical energy to electric energy), and it has been widely applied to fields such as actuators and sensors. For example, a piezoelectric material is advantageously applied to minute positioning and used for fine-controlling optical systems because the amount of strain thereof is substantially in proportion to the applied electric field when estimated in the $10^{-10}$ m/V order (in the case of PZT). Further, to the contrary, since the amount of charge is in proportion to the applied stress or the amount of strain caused by the stress, the piezoelectric material is also used for sensors detecting a minute stress or strain. In addition, because of the excellent response of the piezoelectric material, it is also possible to cause resonance of the piezoelectric material by exciting the material per se or an elastic body connecting thereto by applying an AC electric field.

An ultrasonic motor is an example of the above and utilized for an auto-focusing mechanism of cameras, etc. Furthermore, a piezoelectric gyro and an active damper are examples utilizing both characteristics of the piezoelectric material such that it is distorted in proportion to the applied electric field and generates a charge in proportion to the applied stress and the amount of strain thereof. In the former, an elastic body is excited to resonant by applying an AC electric field to a piezoelectric material; and when an angular speed due to a rotary movement is externally added thereto, the speed is quantified such that the Coriolis force generated therein is converted again to an electric signal by the piezoelectric material. Meanwhile, in the latter, externally applied vibration is quantified by converting it to an electric signal using the piezoelectric material; and the vibration is compulsorily canceled by applying an AC electric field having an opposite phase.

A majority of piezoelectric materials practically used today belong to a solid solution system (PZT system) composed of $PbZrO_3(PZ)$-$PbTiO_3(PT)$. This is because a material having excellent piezoelectric characteristics can be obtained by using a composition near the morphotropic phase boundary (M.P.B.) between PZ of the trigonal system and PT of the tetragonal system. By adding a variety of sub-components and additives to a composition of M.P.B., a wide range of compositions have been developed to meet various kinds of demand. Examples of these compositions are those which are suitably used for actuators and the like for positioning because of a small quality factor ($Q_m$) and a large piezoelectric constant ($d_{ij}$) and those which are suitably used for an ultrasonic wave generating element of an ultrasonic motor or the like because of a large quality factor ($Q_m$) and a small piezoelectric constant ($d_{ij}$).

Meanwhile, an electrostrictive material has similar characteristics to a piezoelectric material. In the case of electrostriction, the amount of strain is in proportion to the square of the applied electric field. Further, an electrostrictive material is advantageous over a piezoelectric material in that the strain induced by electric field is not accompanied with hysteresis because it utilizes the paraelectric phase of a relaxer ferroelectric material. Meanwhile, in the case of a piezoelectric material, the strain induced by electric field is accompanied with hysteresis, since a ferroelectric material is used for a piezoelectric material to overcome some problems, such as polarization treatment required when the material is used as ceramic.

A majority of electrostrictive materials practically used today are complex oxides the basic composition of which is $Pb(Mg_{1/3}Nb_{2/3})O_3(PMN)$. This is because PMN fulfills both of the following requirements: a material is required to have as largest dielectric constant as possible because the electrostrictive constant thereof is in proportion to the square of the dielectric constant; and a material is required to have a Curie temperature ($T_c$) slightly lower than room temperature so as to stay in the paraelectric phase at a temperature, at which the material is used, for canceling hysteresis accompanied with strain induced by electric field.

A majority of other piezoelectric and electrostrictive materials practically used today have a solid solution composition essentially consisting of a lead-type perovskite composition, such as PZT and PMN.

However, those lead types piezoelectric (electrostrictive) materials contain a large amount of lead oxide (PbO), which is highly volatile even at a low temperature, as a main component. For example, approximately two thirds by weight of PZT and PMN are lead oxide. Heat treatments, such as sintering and melting, are essential for manufacturing ceramic or single crystals from those piezoelectric (electrostrictive) materials, thus an extremely large amount of lead oxide volatilizes and diffuses into the atmosphere, when considering it from industrial point of view. Consequently, a demand for mitigating pollution, that is, non-leaded materials, will be inevitably generated in the future corresponding to increases in the applied fields and the amount of usage of piezoelectric (electrostrictive) ceramic and single crystals. Therefore, non-leaded or low-leaded materials having excellent piezoelectric (electrostrictive) characteristics are in demand from an ecological point of view and for preventing pollution.

SUMMARY OF THE INVENTION

Accordingly, it is an object of the present invention to provide a non-leaded or a low-leaded material having excellent piezoelectric (electrostrictive) characteristics.

For achieving the above object, the present invention provides a dielectric ceramic composition comprising a binary system solid solution, (1–x) BNT–xNN, wherein BNT is $(Bi_{1/2}Na_{1/2})TiO_3$ and NN is $NaNbO_3$, as constituents of the binary system solid solution, respectively, and $0<x<1$.

The binary system solid solution of the present invention is represented by BNT–mNN, wherein m=100x (%).

A main component of a solid solution of the present invention is $(Bi_{1/2}Na_{1/2})TiO_3$(BNT), which is a ferroelectric material with a Curie temperature of 320° C. and has a perovskite type crystal structure of a trigonal system. Meanwhile, $NaNbO_3$(NN) is an anti-ferroelectric material having a perovskite type crystal structure of an orthorhombic system. It is known that PZT has excellent characteristics because it is obtained by dissolving PT which is a perovskite type ferroelectric material of a tetragonal system and PZ which is a perovskite type anti-ferroelectric material of a trigonal system. Thus, the BNT–mNN solid solution is expected to have similar advantages. In addition, since a solid solution of the present invention is a non-leaded piezoelectric material which does not at all contain lead, it can completely solve the above pollution problems due to volatilization and diffusion of the lead component during the heat treatment process.

DETAILED DESCRIPTION OF THE PREFERRED EMBODIMENTS

Raw material powders of bismuth oxide ($Bi_2O_3$), sodium carbonate ($Na_2CO_3$), niobium oxide ($Nb_2O_5$), and titanium oxide ($TiO_2$) were used as source materials. Respectively, the predetermined amounts of the source materials sufficiently dried at 100° C. or more were weighed and mixed for approximately 10 hours in a zirconia ball with acetone, as a solvent, by using a ball mill. The mixed powder of the raw materials was sufficiently dried and press-molded, followed by calcination at 800° C. for 2 hours. Further, the resulting material was pulverized for 20 hours by a ball mill, dried again, and grained after being added with P.V.A. (polyvinyl alcohol) as a binder. The grained particles were molded into disk-shaped pellets having a diameter of 20 mm and a thickness of 1.5 mm by a uniaxial press-molding machine at a pressure of 1,000 to 2,000 $kgf/cm^2$. The thus-molded samples were heat-treated at 500° C. for 3 hours for volatilizing the binder, and then, subjected to firing at 950° to 1,300° C. for 2 to 4 hours during which the temperature was raised and reduced at a ratio of 100° C./minute. Each of the thus-obtained samples was polished into parallel plates having a thickness of approximately 0.4 to 0.5 mm and a silver paste was welded thereto as an electrode at 550° C. The samples were subjected to evaluation of the ceramic characteristics, the specific resistance, the dielectric characteristics, the piezoelectric characteristics, the mechanical characteristics, the piezoelectric strain and the like.

An X-ray diffractometer manufactured by JOEL was used for determining the crystal structure and the lattice constant of the samples. Additionally, the density ratio was obtained by comparing the actual density and the theoretical density. Further, the surface microstructure of the ceramic was observed by using a scanning electron microscope (SEM model S-2400) manufactured by HITACHI. For the SEM observation, the surface of each samples was mirror-finished by using a diamond paste and subjected to heat-etching at 100° C. for 30 minutes. In addition, the specific resistance was measured in a temperature range of from 30° to 180° C. at an applied electric field of 100 V/mm by using a high resistance meter (YHP4329A). The temperature characteristics of the dielectric constant and the dielectric loss were automatically measured at a frequency of 1 MHz by using an LCR meter (YHP4275A) and a desktop computer (HP9825B). Then, for estimating the ferroelectric characteristics of the samples, the D–E hysteresis loop was observed at room temperature and at 50 kHz by using a Sawyer-Tower circuit to obtain the values of residual polarization and coercive electric field. The piezoelectric characteristics were evaluated such that the coupling factor ($k_{ij}$), the frequency constant ($N_{ij}$), the elastic compliance ($s_{ij}$), the piezoelectric constant ($d_{ij}$), the quality factor ($Q_m$), and the like were automatically measured according to the resonance and antiresonance method by using an LF impedance analyzer (YHP4192A) and a desktop computer HP9816S. Further, for estimating the mechanical breaking strength of the dielectric ceramic as the mechanical characteristics thereof, the anti-flexure strength was automatically measured according to a three-point flexure test by using a pressure sensor type LM-A manufactured by KYOWA DENGYO, a strain measuring instrument model DPM-611 manufactured by KYOWA DENGYO, and a desktop computer FM-8 manufactured by FUJITSU. Furthermore, as the piezoelectric actuator characteristics, the characteristics of the strain induced by electric field were directly measured by using a strain gauge. The results thereof are shown in Tables 1 and 2.

TABLE 1

| m | CRYSTAL SYSTEM | a (Å) | c (Å) | $T_c$ | $\epsilon s$ (RT) | $\epsilon s$ ($T_c$) | $\tan\delta$ (RT) | $\tan\delta$ ($T_c$) |
|---|---|---|---|---|---|---|---|---|
| 0 | TRIGONAL | 3.882 | | 364 | 558 | 2740 | 4.89 | 1.21 |
| 1 | TRIGONAL | 3.878 | | | | | | |
| 2 | TRIGONAL | 3.882 | | | | | | |
| 3 | TRIGONAL | 3.874 | | 341 | 529 | 2237 | 4.37 | 2.94 |
| 4 | TRIGONAL | 3.878 | | | | | | |
| 5 | TRIGONAL | 3.891 | | 338 | 534 | 2089 | 4.17 | 4.42 |
| 6 | TRIGONAL | 3.874 | | | | | | |
| 7 | TRIGONAL | 3.882 | | | | | | |
| 10 | TRIGONAL | 3.891 | | 305 | 638 | 1847 | 3.30 | 3.50 |
| 15 | TRIGONAL | 3.886 | | | | | | |
| 20 | TRIGONAL | 3.895 | | 220 | 1082 | 1277 | 2.28 | |
| 30 | TRIGONAL | 3.899 | | | 999 | | 1.00 | |
| 40 | TRIGONAL | 3.899 | | | 917 | | 0.65 | |
| 50 | TRIGONAL | 3.887 | | | 875 | | 1.58 | |
| 60 | TRIGONAL | 3.887 | | | 828 | | 0.50 | |
| 70 | TRIGONAL | 3.935 | | | 844 | | 0.60 | |
| 80 | TRIGONAL | 3.892 | | | 1101 | | 0.40 | |

| m | CRYSTAL SYSTEM | a (Å) | c (Å) | $T_A$ | $\epsilon s$ (RT) | $\epsilon s$ ($T_A$) | $\tan\delta$ (RT) | $\tan\delta$ ($T_A$) |
|---|---|---|---|---|---|---|---|---|
| 90 | TRIGONAL | 3.892 | | 275 | 431 | 951 | 0.89 | 0.88 |
| 92 | ORTHO-RHOMBIC | 3.903 | 3.910 | 300 | 302 | 861 | 0.81 | 3.32 |
| 94 | ORTHO-RHOMBIC | 3.897 | 3.907 | 330 | 328 | 1033 | 1.22 | 0.81 |
| 96 | ORTHO-RHOMBIC | 3.889 | 3.908 | 360 | | 1046 | | 3.35 |
| 98 | ORTHO-RHOMBIC | 3.884 | 3.910 | 355 | | 914 | | 3.47 |
| 99 | ORTHO-RHOMBIC | 3.873 | 3.903 | 360 | 233 | 1066 | 2.50 | 1.82 |

Note:
$T_c$ is Curie Temperature (°C.);
$T_A$ is a temperature at an anti-ferroelectric peak;
$\epsilon s$ (RT), $\epsilon s$ ($T_c$), and $\epsilon s$ ($T_A$) are dielectric constants at room temperature, $T_c$, and $T_A$, respectively; and
$\tan\delta$ (RT), $\tan\delta$ ($T_c$), $\tan\delta$ ($T_A$) are dielectric losses at room temperature, $T_c$, and $T_A$, respectively.

TABLE 2

| | m | | | | | | | |
|---|---|---|---|---|---|---|---|---|
| | 0 | 1 | 2 | 3 | 4 | 5 | 6 | 7 |
| $P_r$ | 17.2 | 25.7 | 27.7 | 32.6 | 27.7 | 24.7 | | 19.8 |
| $E_c$ | 30.1 | 47.6 | 57.5 | 46.4 | 46.9 | 48.1 | | 46.6 |
| $k_p$ | 14.6 | 10.9 | 10.6 | 10.8 | 9.8 | 9.2 | 10.9 | 11.3 |
| $k_t$ | 36.4 | 32.1 | 29.6 | 42.4 | 31.6 | 29.8 | 37.4 | 2.97 |
| $k_{33}$ | 33.2 | 33.5 | 31.9 | 43.3 | 31.5 | 24.3 | 3.25 | |
| $k_t/k_p$ | 2.49 | 2.94 | 2.79 | 3.92 | 3.22 | 3.23 | 3.43 | 2.62 |
| $N_p$ | | 3180 | 3242 | 3220 | 3172 | 3210 | 3218 | 3117 |
| $N_t$ | | 2520 | 2551 | 2572 | 2444 | 2497 | 2464 | 2519 |
| $N_{33}$ | | 2493 | 2508 | 2504 | 2486 | 2459 | 2438 | |
| $\epsilon_{33}^T/\epsilon_0$ | | 319 | 316 | 338 | 420 | 427 | 505 | 534 |
| $d_{33}$ | 47.0 | 49.9 | 47.0 | 71.1 | 54.6 | 41.8 | 62.7 | |
| $g_{33}$ | 18.4 | 17.6 | 16.8 | 23.8 | 14.7 | 11.1 | 14.0 | |
| $s_{33}^E$ | 7.86 | 7.85 | 7.73 | 9.03 | 8.08 | 7.85 | 8.35 | |
| $s_{33}^D$ | 7.00 | 6.97 | 6.95 | 7.34 | 7.28 | 7.39 | 7.47 | |

Note:
$P_r$ is residual polarization ($\mu C/cm^2$);
$E_c$ is coercive electric field (kV/cm);
$k_p$, $k_t$, and $k_{33}$ are coupling factors (%);
$N_p$, $N_t$, and $N_{33}$ are frequency constants (Hz · m);

TABLE 2-continued

| | | | m | | | | |
|---|---|---|---|---|---|---|---|
| 0 | 1 | 2 | 3 | 4 | 5 | 6 | 7 |

$\epsilon_{33}{}^T/\epsilon_0$ is dielectric constant;
$d_{33}$ is piezoelectric strain constant ($10^{-12}$ C/N)
$g_{33}$ is piezoelectric voltage constant ($10^{-3}$ V · m/N); and
$s_{33}{}^E$, $s_{33}{}^D$ are elastic compliances ($10^{-12}$ m²/N).

The characteristics of the BNT–mNN solid solution will be described below.

In a region containing a large amount of BNT, the crystal structure of the BNT–mNN solid solution was the perovskite type of the trigonal system and, around the region containing 92% of the NN solid solution, it changed to the perovskite type of the orthorhombic system. Thus, the M.P.B. was supposed to be in a region the m value of which was around 90 to 92.

Concerning the temperature characteristics of the dielectric constant, in a range of $0 \leq m \leq 10$, the Curie point (hereinafter referred to $T_c$) decreased and the peak of the dielectric constant at $T_c$ became unsharp in correspondence to an increase in the m value. The temperature characteristics of the dielectric constant was very broad in a range of $10 < m < 90$ such that it smoothly decreased from room temperature to a high temperature. A sharp anti-ferroelectric peak was observed in a range of $90 \leq m$.

Observation of the D–E hysteresis loop revealed that the residual polarization $P_r$ reached a maximum value of 32.6 µC/cm² in a composition of BNT–3NN, suggesting a possibility of high piezoelectricity. In addition, the coercive electric field $E_c$ of this composition was 46.4 kV/cm.

With respect to BNT–3NN having a high $P_r$ value, the polling conditions were evaluated by setting the coupling factor $k_{33}$ as a standard and the electric field $E_p$, temperature $T_p$, and time $t_p$ as parameters. The optimum conditions revealed that $E_p$ was 6 to 7 kV/mm, $T_p$ was 40° to 70° C. and $t_p$ was 60 minutes.

Concerning the coupling factor, although the $k_p$ value scarcely depended on the compositions, $k_t$ and $k_{33}$ reached their maximum values in BNT–3NN, as had been expected, and the $k_t$, $k_{33}$ and $k_p$ values were 42.4%, 43.3% and 10.8%, respectively.

The frequency constant scarcely depended on the compositions and generally exhibited a large value such that $N_p$, $N_t$ and $N_{33}$ were respectively 3,220 Hz·m, 2,572 Hz·m and 2,504 Hz·m in BNT–3NN.

The dielectric constant $\epsilon_{33}{}^T/\epsilon_0$ tended to increase with an elevation in the m value in a range of $m \leq 7$. The $\epsilon_{33}{}^T/\epsilon_0$ value in BNT–3NN was 338

The piezoelectric strain constant $d_{33}$ and the piezoelectric voltage constant $g_{33}$ reached their maximum values in BNT–3NN, as had been expected, and were $71.1 \times 10^{12}$ C/N and $23.8 \times 10^{-3}$ V·m/N, respectively.

The elastic compliance value was generally small such that $s_{33}{}^E$ was $9.03 \times 10^{-12}$ m²/N and $s_{33}{}^D$ was $7.34 \times 10^{-12}$ m²/N in BNT–3NN.

The strain characteristics induced by electric field was measured about the horizontal direction of BNT–3NN treated with polarization at 6 kV/mm at 70° C. for 60 minutes. As a result, the amount of strain thereof was approximately $4 \times 10^{-5}$ when an electric field of 20 kV/cm was applied.

As described above, the present invention provides a non-lead binary system solid solution BNT–mNN composed of $(Bi_{1/2}Na_{1/2})TiO_3$(BNT) and $NaNbO_3$(NN) as constituents. It thereby becomes possible to completely avoid the volatilization and diffusion of lead oxide into the atmosphere in heat treatment processes, such as sintering and melting, which phenomenon is unavoidable in conventional lead-type piezoelectric (electrostrictive) materials, such as PZT and PMN, in which two thirds by weight thereof are lead oxide (PbO) highly volatile even at a low temperature. Therefore the present invention is a fundamental solution of the lead problem which will inevitably arise in the future corresponding to increases in the applied fields and the amount of usage of piezoelectric (electrostrictive) ceramic and single crystals, and further, it has significant advantages from an ecological point of view and for preventing pollution. In addition, it is also expected that the BNT–mNN binary solid solution becomes more advantageous by using it as a base with which other kinds of ferroelectric materials are dissolved.

What is claimed is:

1. A dielectric ceramic composition comprising a binary system solid solution, (1–x) BNT–xNN, wherein BNT is $(Bi_{1/2}Na_{1/2})TiO_3$ and NN is $NaNbO_3$, as constituents of the binary system solid solution, respectively, and $0 < x < 1$.

* * * * *